United States Patent [19]

Prochnow

[11] Patent Number: 4,826,691

[45] Date of Patent: May 2, 1989

[54] CARRIER FOR FISH ATTRACTANT

[75] Inventor: John A. Prochnow, Spirit Lake, Iowa

[73] Assignee: Berkley, Inc., Spirit Lake, Iowa

[21] Appl. No.: 80,730

[22] Filed: Aug. 3, 1987

[51] Int. Cl.$^4$ .......................... A23K 1/18; A23K 1/20; A01K 85/00

[52] U.S. Cl. .......................... 426/1; 424/78; 424/84; 426/805; 43/18.1; 43/42.39; 43/42.28; 43/42.44; 43/43.12; 43/43.14

[58] Field of Search ............... 424/78, 84; 426/1, 805; 43/18.1, 42.28, 42.39, 42.44, 43.12, 43.14

[56] References Cited

U.S. PATENT DOCUMENTS

| | | | |
|---|---|---|---|
| 1,393,617 | 10/1921 | Frame . | |
| 2,797,519 | 7/1957 | Keller | 43/42.06 |
| 2,826,853 | 3/1958 | Guy et al. | 43/42.06 |
| 2,874,048 | 2/1959 | Walldov | 99/3 |
| 2,979,778 | 4/1961 | Fitzsimons | 264/331.15 |
| 3,410,689 | 11/1968 | Nathan | 99/3 |
| 3,684,519 | 8/1972 | Combs | 99/3 |
| 3,875,302 | 4/1975 | Inoue | 426/1 |
| 3,903,304 | 9/1975 | Groninger, Jr. et al. | 530/402 |
| 3,988,479 | 10/1976 | Stephan et al. | 426/1 |
| 4,245,420 | 1/1981 | Carr | 43/42.06 |
| 4,463,018 | 7/1984 | Carr | 426/805 |
| 4,576,821 | 3/1986 | Smith et al. | 426/1 |
| 4,731,247 | 3/1988 | Wolford et al. | 426/1 |

FOREIGN PATENT DOCUMENTS

| | | |
|---|---|---|
| 2423608 | 1/1975 | Fed. Rep. of Germany . |
| 49-28639 | 3/1974 | Japan . |
| 59-98637 | 6/1984 | Japan . |
| 61-162141A2 | 7/1986 | Japan . |
| 61-260841A2 | 11/1986 | Japan . |
| 1567846 | 5/1980 | United Kingdom . |

OTHER PUBLICATIONS

Pitcher, Tony J. (Ed.), "The Role of Olfaction in Fish Behavior," The Behavior of Teleost Fishes, pp. 152–176, Johns Hopkins University Press (1986).

Shparkovskii, et al., Chemical Abstracts 102 (15): 129168q.

Murata, Chemical Abstracts 104 (25):222210y.

Hara, Toshiaki J., "Chemoreception," Fish Physiology, vol. 5, 1971, pp. 79–120, Academic Press, Inc.

Hara, Toshiaki J., "Olfaction in Fish," Progress in Neurobiology, vol. 5, Part 4; 1975, pp. 271–335 Pergamon Press.

Hara, Toshiaki J. (ed). "Chemoreception in Fishes," Developments in Aquaculature & Fisheries Science, 8, 1982, Elsevier Scientific Publishing Co.

*Primary Examiner*—John Kight
*Assistant Examiner*—Carlos Azpuru
*Attorney, Agent, or Firm*—Faegre & Benson

[57] ABSTRACT

Powdered, high molecular weight, water soluble, membrane film forming polymeric materials are blended with powdered marine life attractants to produce a free-flowing powdered membrane film forming marine life attractant formulation. The formulation can be applied directly to the wet surface of a lure substrate, forming a gelatinous membrane film on the surface of the lure. When the gelatinous membrane film coated lure in immersed in water, an effective track or trail of marine life attractant is gradually released into the water. By careful selection of the polymeric materials, a formulation can be prepared which will produce a slimy textured viscoelastic gelatinous membrane film on a wet surface or a lure substrate.

16 Claims, No Drawings

CARRIER FOR FISH ATTRACTANT

BACKGROUND OF THE INVENTION

1. Field of the Invention.

This invention relates to a free-flowing powdered formulation containing a marine life attractant. This formulation adheres to the wet surface of a lure substrate, forming a gelatinous membrane film thereon. This membrane film containing the attractant is water soluble, so that in water the entire membrane film gradually dissolves away from the surface of the lure substrate, releasing an effective trail or track of stimulating attractant.

2. Description of the Prior Art.

Marine life, such as fish and crustaceans, are well known to be attracted by certain odors and tastes. Accordingly, a great deal of research has been directed toward developing artificial baits utilizing materials attractive to the olfactory and gustatory senses of various fish and crustaceans.

Commercial marine life attractant mixtures that have been available for years are typically liquids, containing a variety of materials that are claimed to attract and lure fish and crustaceans.

U.S. Pat. No. 1,393,617 discloses an artificial lure having an internal cavity containing a fish oil-soaked cotton swab, which allows the fish oil to permeate into the water through perforations in the lure.

U.S. Pat. No. 2,797,519 describes an artificial fishing lure, formed with a porous resilient plastic or sponge rubber surface capable of absorbing fish attractant for subsequent release upon immersion in water.

U.S. Pat. No. 2,826,853 describes an artificial fish lure containing a chamois strip soaked with a fish attracting oil, which in the water exudes an enticing trail for fish.

U.S. Pat. No. 2,874,048 relates to an artificial edible fish bait formed of a gelatinous body shaped to resemble live bait and which slowly dissolves releasing a fish attractant odor in the surrounding water.

U.S. Pat. No. 2,979,778 describes an artificial fish lure of rigid plastic shaped to resemble natural bait, having incorporated therein a fish attractant which migrates through the plastic for continuous release at the surface.

U.S. Pat. No. 3,410,689 discloses a fish or crustacean bait of foamed plastic having a fish attractant integrally mixed within the solid plastic structure. The bait slowly disintegrates into small particles in the water.

U.S. Pat. No. 3,684,519 describes an artificial bait for fish and crustaceans comprised of finely ground natural bait tissue in a polyacrylamide gel. When exposed in water, the gel swells, releasing the odor of the attractant. This bait is claimed to be particularly useful, since it may be stored without refrigeration for long periods and since it remains active as a bait, especially to crustaceans, in water for up to one month.

U.S. Pat. No. 3,875,302 relates to an artificial bait attractive to fish and crustaceans made from polyvinyl alcohol aqueous gels containing within the gel a natural bait or fish attractant. The bait is formed by freezing, melting and refreezing of aqueous polyvinyl alcohol. This bait is said to remain attractive to crustaceans for 10 days.

U.S. Pat. No. 4,245,420 provides an artificial bait formed of a semi-rigid, flexible, water-insoluble, hydrophilic polymer matrix containing a fish attractant incorporated therein. The formed bait is said to closely resemble natural fish prey and to remain active as a bait for prolonged periods of time.

U.S. Pat. No. 4,576,821 describes a bait for fish and crustaceans consisting essentially of a water insoluble polymer selected from polyamides and copolymers of ethylene with at least one ethylenically unsaturated comonomer, with attractants such as fish meal, powdered fish and fish oil incorporated therein.

Japan Kokai Tokkyo Koho No. 61/260841 A2 [86/260841] describes a pelletized lure for fish comprised of microfibrillated cellulose powder blended with a water-soluble high molecular weight substance and such fish attractants as finely ground natural bait, fish powder and fish oil.

Japan Kokai Tokkyo Koho JP No. 61/162141 A2 [86/162141] relates to fish attractants containing pulverized fibers, carboxymethyl cellulose alkali metal mixed salts and natural or artificial fish attractants or baits.

Britisch GB No. 1567846 describes fish bait prepared from inactivated and/or autolyzed yeast blended with conventional components used in fish lures. The bait is said to be especially suitable for use with fresh water fish.

Japan Kokai JP No. 49/28639 [7428639] prepares an aqueous solution of partially saponified polyvinyl acetate mixed with a gelation agent. The gelation agent is present in an amount insuffiient to effect gelation at room temperature, and gelation is then completed by freezing the solution to provide a gel which has good water solubility and is useful as a base for fish luring compositions.

Japan Kokai Tokkyo Koho JP No. 59/98637 A2 [84/98637] describes a soft, strong artificial bait exhibiting controlled release of a fish attractant, which is prepared from a blend of a water insoluble polymer, a water soluble polymer, a hydrophilic water insoluble polymer, and a suitable fish attractant. As an example a mixture of epichlorohydrin ethylene oxide, polyethylene glycol, crosslinked allyl glycidyl ether - ethylene oxide copolymer and powdered squid was mixed and formed into an extruded product.

European Patent Application No. 84306264.7, published on Apr. 17, 1987 (Publication No. 0137748), describes liquified fish, fish oils, anise, amino acids or synthetic attractants as fish attractants.

German Published Patent Application DE No. 2423608 describes combinations of amino acids and aspartates that have a luring effect on fish. Academic study of chemoreception on fish behavior has been extensive.

Although there is evidence that feeding behavior in different species is stimulated by somewhat different chemical substances, four indicia have been identified as characteristic of all feeding stimulants. According to THE BEHAVIOR OF TELEOST FISHES, Edited by Tony J. Pitcher, The Johns Hopkins University Press, 1986, page 167, fish feeding stimulants are: (1) low molecular weight (<1000 MW), (2) non-volatile, (3) contain nitrogen, and (4) are amphoteric. Individual compounds, such as betaine, glycine, alanine and taurine, have been identified as contributing major attractant effectiveness, but mixtures of attractants have nearly always been identified as more effective than single compounds. For example, the effect of amino acids on the behavior and visceral systems of fish has been reported in Chemical Abstracts 102 (15): 129168q. Glutamic and aspartic acids were observed to attract salmonids. Cod were attracted to dicarboxylic amino acids and certain other amino acids. A study of the attraction of coral fish to sea anemone has been presented in Chemical Abstracts 104 (25): 222210y. A combination of amines, including tryptamine and tyramine, were determined to be the attractive substances in the secretion of sea anemone.

Liquid products that are oil based are observed to act primarily as taste stimulants and water soluble products are observed to contribute an olfactory component. However, liquid attractant products, whether oil or aqueous based, do not adhere well to artificial lures. when they are wetted with water. Since the oil based products will not mix with water, they tend to run off the lure. The water based products demonstrate poor adhesion, since they slough off the lure, dispersing too rapidly in the water to retain their effectiveness. Solid attractants in molded form are also available. Generally, when these are baited on a hook, the action of the lure in water is changed and life-like presentation may be lost. Petrolatum based products have been used to smear a larger quantity of attractant onto a lure. However, owing to the water insolubility of this carrier, the action of the attractant is decreased.

The primary disadvantage to these currently available attractants is that bait and dispensing media are necessary along with the attractant. The attractant, by itself, will not adhere and be retained in sufficient quantities on a lure to be effective, but requires replacement after a short period of time.

SUMMARY OF THE INVENTION

We have now discovered that certain powdered, high molecular weight, water soluble, membrane film forming polymeric materials, when blended with powdered marine life attractants, produce a free-flowing powdered attractant formulation that can be applied directly to the wet surface of a lure substrate, forming a gelatinous membrane film on the surface of the lure. The membrane film containing the attractant, when formed on the wet lure surface, is water soluble, so that in water the entire membrane film dissolves gradually away from the lure surface, releasing into the water an effective trail or track of stimulating attractant.

We have also now discovered that certain of these powdered, high molecular weight, water soluble, membrane film forming polymeric materials, when used in the free-flowing powdered attractant formulation of this invention and applied to the wet surface of a lure substrate, produce a surface texture on the wet lure substrate that imitate the natural slimy texture of certain fish. This additional attractant feature is not seen in any currently available marine life attractant material.

Additional ingredients may also be included in the present inventive powdered attractant mixture, to maintain the free-flowing quality of the mixture, to act as a preservative, or to render the mixture, when applied to the wet surface of a lure substrate, more attractive to marine life. For example, a preservative or stabilizer to prevent undesirable biological growth and spoilage may be included in the formulation. Also, a flow enhancer, such as a hygroscopic agent, may be included to remove moisture and to preserve the free-flowing nature of the formulation during normal usage and exposure to humidity. Coloring matter may be included for imitating in the lure the appearance of blood or other natural prey exudate attractive to marine life or for indicating the level of attractant remaining on the lure. Any such additional ingredients must be chosen to allow the inventive mixture to retain its desirable powdered free-flowing form.

DETAILED DESCRIPTION OF THE PREFERRED EMBODIMENTS

The powdered, high molecular weight, water soluble, membrane film forming polymeric materials contribute the gelatinous membrane film forming nature of the present formulation. Upon combination with the water on the wet surface of the lure substrate, the present polymeric material develops a gelatinous polymeric network, entrapping the attractant, and then allowing the systematic and controlled release of that attractant into the water. Polymers which have been discovered to function in the present novel formulation are varied. However, suitable polymers have been determined to have certain common properties including:

powdered for a large surface area to assure rapid wet-out upon contact with water;

water soluble;

thixotropic, forming a gel upon contact with water;

natural or synthetic orgin, with polymers of relatively higher molecular weight being more suitable.

Polymeric materials which have been determined to be acceptable to fish and to be especially suitable for use in the present formulations include such natural and synthetic polymers as poly-(lower alkylene) glycols, poly-(oxy lower alkylene) glycols, copolymers of acrylic acid crosslinked with a pentaerythritol tetrallyl ether polyfunctional agent, polyvinylpyrrolidone, guar gum, hydroxy lower alkyl cellulose, grain processing extract of amino acid and protein content, polysaccharide soybean derivatives and alginate metallic salts and mixtures thereof. These polymeric materials are chosen from those having relatively high molecular weights, with the desirable molecular weight depending on the individual material. Suitable poly-(lower alkylene) glycols and poly-(oxy lower alkylene) glycols have molecular weights in the range of 100,000 to 5,000,000. Polyvinylpyrrolidone polymers suitably have molecular weights of about 100,000. The hydroxy lower alkyl cellulose polymers have molecular weights of 300,000 to 400,000. Suitable guar gum polymers have molecular weights of about 220,000. The alginate salts have molecular weights of 150,000 to 180,000. The polysaccharide soybean derivatives have molecular weights of 1800 to 3600. Of the polymers just recited, the grain processing extract of amino acid and protein content and the polysaccharide soybean derivatives are slightly less preferred than the others specifically mentioned.

The powdered attractant to be incorporated into the present formulation may be any powdered material or combination of powdered materials which attract or stimulate marine life, such as fish and crustaceans, to feed. A wide variety of powdered attractants, including those described in the background related art cited herein, have been found to be suitable. For example, U.S. Pat. No. 2,874,048, describes powdered bone meal, powdered food solids and powdered anise as having an attractant action on fish. U.S. Pat. No. 2,979,778 recommends rhodinyl acetate for its attractant action. In U.S. Pat. No. 3,410,689, suitable powdered materials described as attractive to fish and crustaceans are dehydrated fish meal, dried slaughterhouse waste products, powdered fish, egg, dried milk products and molasses. U.S. Pat. No. 3,875,302 describes fish powders and synthetic spices having a smell similar to that of fish meat, fish oil, stale fish or shell fish.

Very useful attractants stimulating to both fish and crustaceans are described in U.S. Pat. No. 4,245,420 and in the references cited therein.

U.S. Pat. No. 4,576,821, describes powdered fish or fish meal as an attractant for fish and crustaceans. Suitable attractants for use in the present formulation are also created by using single or mixed attractant materials such as krill powder, pulverized dried sardine, spray dried inactivated and/or autolyzed yeast, powdered squid, borax, wood flour, bentonite, pulp fibers, and cellulosic materials (Japan No. 61/162141 A2 [86/162141], Japan No. 61/260841 A2 [86/260841], Japan No. 59/98637 A2 [84/98637], Brit. GB No. 1567846). Dicarboxylic amino acids and other amino acids, such as glutamic and aspartic acids, are described as species-specific fish attractants in Shparkovskii, et al., Chemical Abstracts 102(15):129168q. Individual amine compounds, such as betaine, glycine, alanine, taurine, tryptamine, and tyramine, have been identified as having an attractant effect, but mixtures are nearly always more effective than single compounds.

Academic study of fish behavior relating to chemoreception describes a wide variety of attractant materials suitable for use in the present formulation. Very useful attractants are disclosed in the following publications:

Hara, Toshiaki J., "Chemoreception," Fish Physiology, Vol. 5, 1971, pp. 79-120, Academic Press Inc.

Hara, Toshiaki J., "Olfaction in Fish," Progress in Neurobiology, Vol. 5, Part 4, 1975, pp. 271-335,Pergamon Press.

Hara, Toshiaki J. (Ed.), "Chemoreception in Fishes," Developments in Aquaculture and Fisheries Science, 8, 1982, Elsevier Scientific Publishing Co.

Pitcher, Tony J. (Ed.), "The Role of Olfaction in Fish Behavior," The Behavior of Teleost Fishes, 1986, pp. 152-176, The Johns Hopkins University Press.

The percentage of powdered attractant in the present formulation is determined primarily by the nature of the specific attractant material. Certain attractants, which have an extremely concentrated attractive effect on marine life, may be used in the present formulation in amounts as low as between about 5-10 weight percent of the total formulation. When bulky or general attractants, such as powdered fish meal, are used in the present formulation, they are generally present in an amount of at least about 50 weight percent of the total formulation. Broadly, formulation of the present invention containing amounts of attractant in the range of between about 5-95 weight percent of the total formulation have been found to be effective in luring marine life when applied to the wet surface of a lure substrate.

As has been stated herein previously, the present attractant formulation may also contain such additional ingredients as preservatives, stabilizers, flow enhancers and coloring agents.

A preservative or stabilizer is added to prevent the growth of biologically active species that lead to spoilage. Many types have been suggested for use in artificial and semi-artificial bait products and are common in attractant usage. Mixtures of such preservatives and stabilizers may be used to provide protection against different types of growth species. Suitable preservatives include potassium sorbate, formaldehyde, benzyl alcohol, EDTA or its various sodium salts (such as Hampene Acid, from W. R. Grace), methyl or propyl parabens (such as those available from Inolex Personal Care Products or Mallinckrodt, Inc.), and diazolidinyl urea (such as Germall II, from Sutton Laboratories). Many known preservatives are very offensive to fish and crustaceans and thus a suitable selection for incorporation into the present formulation must be made based on effectiveness as a preservative or stabilizer as well as acceptability to marine life.

A flow enhancer as intended herein is an additive that preferentially absorbs any moisture that might otherwise cause clumping or caking of some of the powdered ingredients, adversely affecting the free-flowing qualities of the present attractant formulation. An especially preferred flow enhancer is a powdered silica gel, such as Sylox, available from the Davison Chemical division of W. R. Grace.

To prepare the present powdered attractant formulation, the powdered, high molecular weight, water soluble, membrane film forming polymeric material, the powdered attractant and any desired additional ingredients are dry-blended to form a free-flowing powdered mixture.

The present powdered attractant formulation may be used with any conventional lure of glass, wood, metal, plastic or similar material, in any suitable form attractive to feeding marine life. The surface of the lure is wet with water and then coated with the present formulation. Adhesion is good to virtually any lure surface and the formulation forms a gel that is retained on the wet surface of the lure. As has been mentioned previously, when certain specific polymeric materials are used in the present formulation, the gel will have a slimy texture. This slimy texture duplicates the feel of natural marine life prey and is a feature not found in any presently available attractant material.

In the following examples, the attractant used throughout was defatted ground fish meal, from Zapata Haynie Corp. of Reedville, VA 22539. The preservative used throughout was diazolidinyl urea, available from Sutton Laboratories under the trade name GEIMALL II.

In the following examples, the retention time of the present attractant formulation as a gel on the surface of a wet lure was determined by the following method. In each example the powdered attractant formulation of this invention was adhered to the wet surface of a lure and formed a gel on the surface thereof. The lure was placed into a test flow chamber, having a cross section of 6×6 inches and a linear flow rate of water of 18 inches per second. The water temperature was maintained at 25+/−3° C. Retention time was reported as the time until no visually observable trace of the example formulation remained on the lure. The retention time is dependent upon the amount of powdered attractant formulation adhered to the lure to form various sizes of gels and on the flow rate of the water in the test flow chamber. In all examples, the flow rate was constant at a rate of 167 gallons per minute and the same wet lure, formed of plastic-coated balsa wood, was used to reduce variations in gel formation. Retention is reported as a measure of the effectiveness and life usage of the powdered attractant formulation of the specific example.

EXAMPLE 1

PEG-90M—49 weight percent
attractant—50 weight percent
preservative—1 weight percent
FDC Blue#1 —trace PEG-90M Polyox WSR-301 is a polyethylene glycol poly(oxyethylene) glycol, from Union Carbide. The FDC Blue #1 is a powdered dye, from Pylam Products Co., Inc., which in unnoticeable in the dry form, but imparts a blue tint to the formed gel. The ingredients were dry blended to produce a free-flowing mixture. It adheres well to wet glass, metal of plastic lures, such as plastic worms or painted plastic lures, forming a slimy textured gel. The retention time was 50 minutes.

EXAMPLE 2

Carbomer 941—49 weight percent
attractant—50 weight percent
preservative—1 weight percent Carbomer 941 is a copolymer of acrylic acid crosslinked with a polyfunctional agent, pentaerthritol tetrallyl ether, available from RITA Corp. under the trade name ACRITAMER 941. The ingredients were dry blended to form a free-flowing mixture that formed a gel on the wet surface of a lure. Adhesion was good. This formulation did not yield a gel with a slimy texture. The retention time was 5 m:nutes.

EXAMPLE 3

Polyvinylpyrrolidone—79 weight percent
attractant—20 weight percent
preservative—1 weight percent Polyvinylpyrrolidone, is a linear polymer of 1-vinyl-2-pyrrolidone, available from BASF under the trade name, LUVISKOL K-90. The ingredients were dry blended to form a free flowing mixture that formed a gel on the wet surface of a lure. Adhesion was good and this formulation did not form a slimy textured gel. Retention time was 75 minutes.

EXAMPLE 4

Guar gum—49 weight percent
attractant—50 weight percent
preservative—1 weight percent Guar gun is the ground endosperms of *Cyamopsis tetragonolobus* (L) used as a food product thickener, available from RITA Corp., under the trade name Guar C261. The ingredients were dry blended to form a free-flowing mixture that formed a gel on the wet surface of a lure. Adhesion was good and this formulation formed a slimy textured gel. Retention time was 105 minutes.

EXAMPLE 5

Polyvinylpyrrolidone—5 weight percent
Carbomer 941—5 weight percent
PEG-90M—39 weight percent
attractant—50 weight percent
preservative—1 weight percent A blend of three previously cited polymeric materials is used. The ingredients were dry blended to form a free-flowing mixture that formed a slimy textured gel on the wet surface of a lure. Adhesion was good and retention time was 62 minutes.

EXAMPLE 6

PEG-14M—50 weight percent
attractant—50 weight percent
FDC Green#8 —trace

PEG-14M as another type of polyethylene glycol, available from Union Carbide, under the tradename Polyox WSR-N-3000. The FDC green #8, available from Pylam Products Co., Inc., was used in approximately 0.005% by weight. It produces a green tinted gel, but is unoticeable in the dry form. The ingredients were dry blended to form a free-flowing mixture that formed a slimy textured gel on the wet surface of a lure. Adhesion was good and retention time was 22 minutes.

EXAMPLE 7

Hydroxyethyl cellulose—49 weight percent
attractant—50 weight percent
preservative—1 weight percent
FDC Red#33 —trace Hydroxyethyl cellulose is a tackifier used in food products, available from Union Carbide under the trade name Cellosize ER-4400. The FDC Red#33, available from Pylam Products Co., Inc., was used in approximately 0.005% by weight. It produces a red tinted gel, but is unnoticeable in the dry form. The ingredients were dry blended to form a free-flowing mixture that formed a gel on the wet surface of a lure. Adhesion was good and this formulation did not form a slimy textured gel. Retention time was 3 minutes

EXAMPLE 8

Grain extracted protein amino acid—90.00 weight percent
silicone anti-caking agent—0.15 weight percent
preservative—0.75 weight percent
attractant—9.10 weight percent The grain extracted protein and amino acid material is Pro-Fam S974 made by Grain Processing Corp. of Muscatine, IA. The anti-caking agent added to increase flowability is Sylox 15 made by Davison Chemical, a division of W. R. Grace. The ingredients were dry blended to a uniform powdered mixture. It forms a gel onto a wet surface, having a retention time of 0.33 minutes. The gel exhibits a slippery, but not viscoelastic texture.

EXAMPLE 9

Grain extracted polysaccharide—90.00 weight percent
preservative—0.75 weight percent
attractant—9.25 weight percent The grain extracted polysaccharide is Maltrin M-100 made by Grain Processing Corp. of Muscatine, IA. The ingredients were dry blended to a free flowing powdered material. It formed a gel on a wet surface producing a wet but not viscoelastic texture. Retention time was 0.33 minutes.

EXAMPLE 10

Ammonium and calcium alginate—90.00 weight percent
preservative—0.75 weight percent
attractant—9.25 weight percent The ammonium and calcium alginate is Keltose made by Kelco division of Merck. The ingredients were dry blended to a free flowing powder. It forms a gel onto a wet lure and has a retention time of 3.2 minutes The gel is slippery but not viscoelastic.

What is claimed is:

1. A free-flowing powdered, water soluble, membrane film-forming marine life attractant formulation comprising:
   a powdered, high molecular weight, water soluble, membrane film-forming thixotropic polymeric material; and
   a powdered marine life attractant.

2. A formulation according to claim 1, wherein the polymeric material has a molecular weight above about 1,000,000.

3. A formulation according to claim 2, wherein the polymeric material is selected from poly(lower alkylene glycols, poly (oxy lower alkylene) glycols, copolymers of acrylic acid copolymerized with a pentaerthritol tetrallyl ether polyfunctional agent, polyvinylpyrrolidone, guar gum, hydroxy lower alkyl cellulose, and mixtures thereof.

4. A formulation according to claim 1, wherein the polymeric material is selected from poly(lower alkylene) glycols, poly(oxy-lower alkylene) glycols, copolymers of acrylic acid copolymerized with a pentaeryrhritol tetrallyl ether polyfunctional agent, polyvinylpyrrolidone, guar gum, hydroxy lower alkyl cellulose, alginate metallic salts, grain processing extract of amino acid and protein content, polysaccnaride soybean derivatives and mixtures thereof.

5. A formulation according to claim 1, wherein the attractant is present in the formulation in an amount of between about 5-95 weight percent of the total formulation.

6. A formulation according to claim 1, containing additional ingredients selected from preservatives, flow enhancers and coloring agents.

7. A formulation according to claim 1, wherein the preservatives are selected from potassium sorbate, formaldehyde, benzyl alcohol, EDTA, sodium salts of EDTA, melthyl parabens, propyl parabens and diazolicnyl urea.

8. A free-flowing, powdered, water soluble, membrane film forming marine life attractant formulation for use with a lure substrate comprising:
a powdered, high molecular weight, water soluble, membrane film forming, thixotropic, marine life acceptable polymeric material; and
a marine life attractant; wherein the formulation forms a gel upon contact with the wet surface of a lure substrate.

9. A formulation according to claim 8, wherein the gel has a viscoelastic textured surface.

10. A formulation according to claim 8, wherein the polymeric material has a molecular weight above about 100,000.

11. A formulation according to claim 10, wherein the polymeric material is selected from poly (lower alkylene) glycols, poly (oxy lower alkylene) glycols, copolymers of acrylic acid crosslinked with a pentaerythritol tetrally ether polyfunctional agent, polyvinylpyrrolidone, guar gum, hydroxy lower alkyl cellulose, alginate metallic salts and mixtures thereof.

12. A formulation according to claim 8, wherein the polymeric material is selected from poly (lower alkylene) glycols, poly (oxy lower alkylene) glycols, copolymers or acrylic acid crosslinked with a pentaerythritol tetrallyl either polyfunctional agent, polyvinylpyrrolidone, guar gum, hydroxy lower alkyl cellulose, alginate metallic salts, grain processing extract of amino acid and protein content, polysaccharide soybean derivatives and mixtures thereof.

13. A formulation according to claim 10, wherein the attractant is present in an amount between about 5-95 weight percent of the total formulation.

14. A formulation according to claim 8, containing additional ingredients selected from preservatives, flow enhancers and coloring agents.

15. A formulation according to claim 13, wherein the preservatives are selected from potassium sorbate, formaldehyde, benzyl alcohol, EDTA, sodium salts of EDTA, methyl parabens, propyl parabens, and diazolidinyl urea.

16. A method of luring marine life comprising:
forming a water soluble, gelatinous membrane film on the surface of a lure substrate by contacting the wet surface of a lure substrate with a free-flowing, powdered, water soluble, membrane film forming marine life attractant formulation; and
immersing the gelatinous membrane film covered lure substrate in water populated by marine life to release into the water an effective amount of marine life attractant.

* * * * *